United States Patent [19]
Hall et al.

[11] Patent Number: 5,471,326
[45] Date of Patent: Nov. 28, 1995

[54] HOLOGRAPHIC LASER SCANNER AND RANGEFINDER

[75] Inventors: James T. Hall, Torrance; Arthur B. O'Connor, Redondo Beach; Susan M. Raffensperger, Long Beach; Seymour Levine, Topanga, all of Calif.

[73] Assignee: Northrop Grumman Corporation, Los Angeles, Calif.

[21] Appl. No.: 56,218

[22] Filed: Apr. 30, 1993

[51] Int. Cl.$^6$ ............................. G02B 5/32; G02B 5/28; G02B 27/42
[52] U.S. Cl. ................. 359/15; 359/18; 359/562
[58] Field of Search ..................... 359/16, 17, 18, 359/562, 15, 590

[56] References Cited

U.S. PATENT DOCUMENTS

| | | | |
|---|---|---|---|
| 3,334,956 | 8/1967 | Staunton | 350/162 |
| 4,895,419 | 1/1990 | Doyle et al. | 350/3.69 |
| 4,948,258 | 8/1990 | Caimi | 356/376 |
| 5,046,794 | 9/1991 | Ritter et al. | 359/18 |
| 5,119,231 | 6/1992 | Nelson et al. | 359/359 |

FOREIGN PATENT DOCUMENTS

| | | | |
|---|---|---|---|
| 59-201017 | 11/1983 | Japan | 359/18 |
| 60-254112A | 12/1985 | Japan . | |
| 61-141418A | 6/1986 | Japan . | |
| 1172919A | 7/1989 | Japan . | |
| 3198020A | 8/1991 | Japan . | |
| 4-289814 | 10/1992 | Japan | 359/18 |
| 2185588A | 7/1987 | United Kingdom . | |

*Primary Examiner*—Martin Lerner
*Attorney, Agent, or Firm*—Terry J. Anderson; Karl J. Hoch, Jr.

[57] ABSTRACT

A holographic optical element (HOE) includes a substrate structure having rotational symmetry with respect to a rotational axis for rotatively supporting at least two holograms. A first hologram on the substrate structure in the path of a normally incident beam diffracts the beam by a first acute angle and in a first radial direction from the rotational axis to a first redirected path. A second hologram on the substrate structure in the first redirected path diffracts the beam by a different second acute angle and in an opposite second radial direction from the rotational axis to a second redirected path. As a result, the two holograms may be used to achieve a second redirected path at an angle to the rotational axis that has a size which is the difference between the size of the first angle and the size of the second angle. The substrate structure may include first, second, and third disc-shaped substrates bonded together so that the third substrate is in between the first and second substrates, and a thin-film interference filter may be included on the third substrate to suppress zero-order leakage through the first hologram. The filter element may include one of a dielectric stack, a transmission hologram, or a reflectance hologram. The first hologram may be imprinted to achieve total internal reflection of zero-order leakage through the second hologram. An additional interference filter may be included on either the output face of the HOE or on a separate window element in order to reflects any zero-order leakage from the second hologram. The HOE may also have Schmidt-type aberration correction superimposed on at least one of the holograms to compensate for spherical aberrations from an all spherical Cassegrain type of telescope.

13 Claims, 7 Drawing Sheets

HOLOGRAPHIC LASER SCANNER AND RANGEFINDER

BACKGROUND OF THE INVENTION

1. Technical Field

This invention relates generally to laser scanners for various applications, including an obstacle avoidance system for a combat helicopter. More particularly, it relates to a holographic optical element suitable for large-beam scanning and suppression of stray light noise.

2. Background Information

Recall that some scanners scan a large angular area with a beam of small angular divergence by mechanically moving portions of the beam-forming optics, usually flat mirrors. The scanner usually uses two sets of mechanically oscillated mirrors for a rectangular scan pattern. One mirror oscillates rapidly to deflect the beam along a line in one direction (e.g., vertically), while the other oscillates more slowly to move the line in a perpendicular direction (horizontally) to produce coverage similar to that in video display technology. Another method involves rotating multifaceted mirrors, each deflecting the beam into a given direction. Still another method deflects the beam with rotating or oscillating prisms.

Each of those methods has certain disadvantages. The oscillating-mirror method usually requires two mirrors, and the oscillations introduce vibrations, time delays, and non-linear rates, as well as limiting the maximum repetition rate. The faceted-mirror method requires mirrors large enough to encompass the entire beam, and that can be prohibitively expensive for large beams. Deflection by prisms is usually practical for only small beams, and small angles, since the weight of the prism becomes large for other conditions. In addition, scanning at high repetition or rotational rates may impart severe stresses in bulky conventional optical elements.

Holographic optical elements (HOEs) can overcome some of those disadvantages. A HOE includes one or more holograms that alter the direction of light rays by diffraction rather than refraction or reflection. It functions essentially independent of substrate geometry. So, the HOE can be made thinner and lighter. It can be replicated inexpensively through a simple photographic process to significantly reduce production costs compared to the grinding and polishing of conventional optical elements. In addition, multiple holograms can be superimposed into a single volume-hologram film to achieve multifunction HOE capability.

HOEs have previously been used for scanning in such applications as point-of-sale terminals by rotating multiple small HOEs into position to deflect a small beam. However, the structure required can be impractical for a larger beam that is used to achieve eye-safety and to obtain high resolution images with low beam divergence. In addition, point-of-sale terminals have no need nor provision for a high signal-to-noise ratio. So the HOEs can be inefficient without concern for the beam energy passing straight through. But this undeviated, bleed-through transmittance of the beam (the zero-order beam) and other stray light can cause noise, undesired ghost images, and other false signals in laser rangefinding. Thus, laser rangefinding needs a better way to take advantage of HOEs.

SUMMARY OF THE INVENTION

This invention solves the problems outlined above by providing a disc-shaped HOE that directs a normally incident on-axis beam to a small off-axis angle while spreading the beam over a sufficiently large exit aperture to reduce the beam intensity to eye-safe levels. Rotating the HOE on a scan axis with suitable scanning components produces a circular scan pattern centered on the scan axis. Moving the scan axis and circular scan pattern over a field of regard, scans the field.

A small scan angle works better for rangefinding at long distances. However, a hologram sufficiently thick to produce the desired small angle introduces various difficulties. The HOE of this invention uses a two-step approach that is more facile. The two-step approach also results in the filter-design advantages subsequently described as well as less scatter and absorption loss.

The HOE includes two holograms. An incoming on-axis laser beam (e.g., 850 nm wavelength) entering normal to the rearward surface of the HOE strikes the first hologram which diffracts the beam into a large off-axis first angle. This redirected, first-order beam thereafter strikes the second hologram which diffracts it into an oppositely directed, large, off-axis second angle. Redirected twice that way, the beam exits the HOE at a small off-axis third angle which is the difference between the first and second angles plus the refraction occurring at the air boundary at the forward surface of the HOE. The final efficiency of the HOE is the product of the efficiencies of the two separate holograms. This final efficiency can be produced more easily with two thin holograms than one much thicker, and more difficult to fabricate, hologram.

Preferably, the HOE includes a thin-film interference filter that suppresses any undeviated beam exiting the first hologram. For that purpose, one version of the invention includes a long-wavelength-pass or large-angle-pass type of filter sandwiched between the first and second holograms. This filter is designed to reflect at nearly 100% reflectance the undeviated zero-order beam exiting the first hologram while passing with little attenuation the diffracted first-order beam. The filter therefore suppresses noise from any zero-order leakage by the square of filter efficiency because the filter acts on both outgoing and returning signals.

Another version of the invention uses a third hologram (a reflection hologram) for zero-order rejection instead of the thin-film interference filter. It reflects a normal-incidence laser beam (the zero-order beam) at nearly 100% efficiency while transmitting at a higher angle with little attenuation. Yet another version uses a transmittance hologram to diffract the zero-order beam at nearly 100% efficiency into an angle that has another filter or that causes a minimum of noise problems, while transmitting the first-order beam.

One advantage of a sufficiently high diffraction angle from the first hologram (i.e., any angle greater than the critical angle) is that any energy not diffracted by the second hologram is totally internally reflected at the forward surface of the HOE (and attenuated fully at the edge of the HOE with black paint). Also, for a first-order diffraction angle that is large but less than the critical angle, any required interference filters for noise rejection from the second hologram are easier to design and produce by conventional means.

An additional filter may therefore be added in series to the HOE sandwich or to a separate window in order to suppress any undeviated beam exiting the second hologram. It can be a reflection or transmission hologram, or it can be a short-wavelength-pass or low-angle-pass type of interference filter. Other interference coatings (e.g., an antireflection type of coating) may be added at air interfaces to realize the full efficiency of the HOE. Such coatings are commonly used for optical elements to realize their full performance.

In yet another version of the invention, the holograms are configured to provide wavefront compensation for aberrations. In that regard, recall that a laser scanner may include conventional optical means, such as a Cassegrain-type telescope, for expanding a laser beam from a small laser source to the larger, on-axis beam desired. Providing wavefront compensation with the holograms in such a system permits use of a Cassegrain-type telescope with inexpensive spherical primary and secondary mirrors, which introduce spherical aberrations to replace more expensive parabolic primary and hyperbolic secondary mirrors. Such wavefront compensation is conventionally provided by a bulky, separate Schmidt plate corrector element. According to this aspect of the invention, however, Schmidt-type correction can be superimposed in the HOE scanning element itself, thereby combining the performance of several elements holographically into a single element. The foregoing and other objects, features, and advantages of the invention become more apparent upon reading the following detailed description with reference to the illustrative drawings.

DESCRIPTION OF THE PREFERRED EMBODIMENTS

Figure 1A:
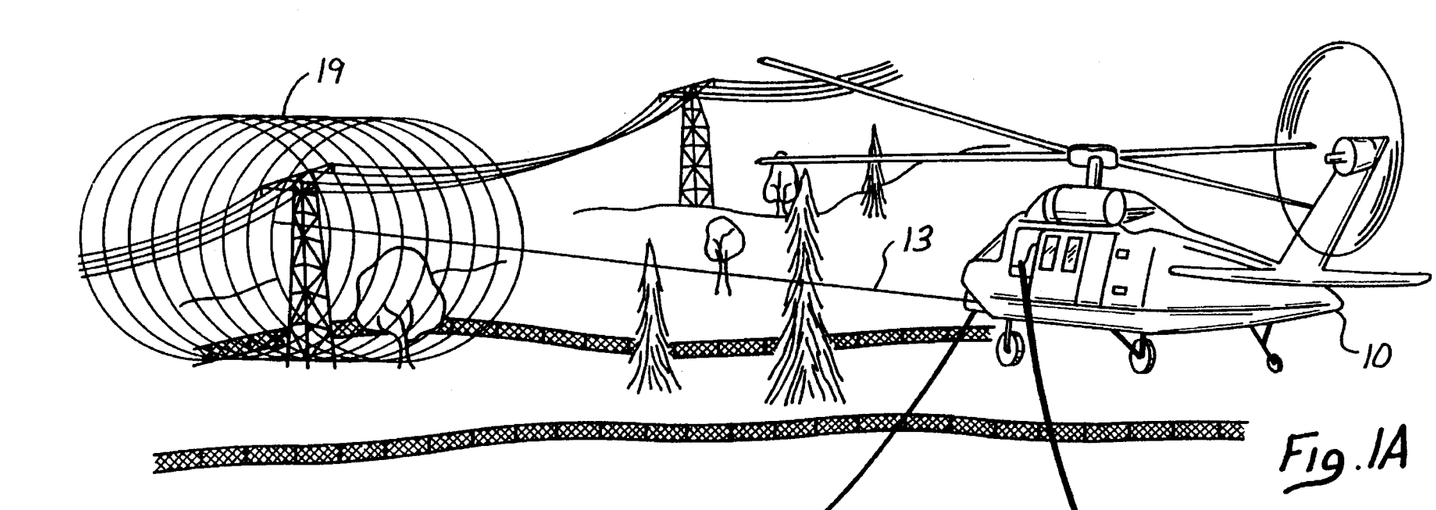
FIG. 1A, 1B and 1C are a pictorial representation of a helicopter outfitted with an obstacle avoidance system that uses a HOE constructed according to the invention.
Figure 1B:
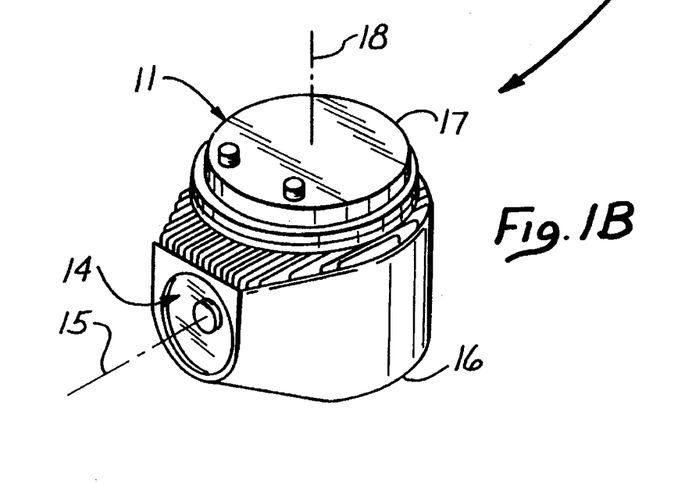
Figure 1C:
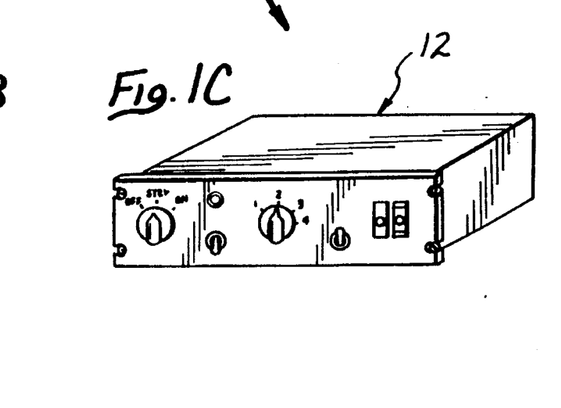

Context. Before examining the holographic optical element of this invention in further detail, consider FIGS. 1A–3 in order to put subsequent descriptions in the context of an actual installation. FIG. 1A to 1C pictorially illustrate a helicopter 10 outfitted with an obstacle avoidance system (OASYS) that includes a turret assembly 11 and a control panel 12. They install onboard the helicopter 10 where they integrate with existing power, avionics, video or heads up display (HUD), and audio systems to provide in-flight warnings and guidance commands to the pilot concerning wires, towers, antennae, trees, terrain features, and other upcoming obstacles.

The turret assembly 11 mounts on existing turret drum structure under the nose of the helicopter 10. There, it provides a platform structure for laser radar (ladar) equipment and associated scanning and processing components. The control panel 12 mounts in a pilot-accessible position within the helicopter 10 where it enables the pilot to set operational modes and otherwise control operation.

In operation, the turret assembly 11 emits a beam 13 of laser energy through a forward-looking window 14. As that occurs, a scanner on the turret assembly 11 scans the beam 13 circularly about a first scan axis 15 that is generally aligned with the longitudinal axis of the aircraft. The scanner includes a HOE that is constructed according to this invention and that is located just behind the window 14. In addition, an azimuth scanner on the turret assembly 11 moves a lower portion 16 of the turret assembly 11 relative to an upper portion 17 in order to define a field of regard. It scans the circular pattern of beam 13 back and forth in azimuth about a second scan axis 18 which may be generally parallel to the vertical axis of the aircraft. Doing so directs the beam 13 in a conical pattern that produces a circular scan pattern in a plane perpendicular to the first scan axis 15 as depicted at reference numeral 19 in FIG. 1A. The azimuthal scan moves the circular scan over the entire field indicated in FIG. 2, where the first scan axis 15 moves the circularly shaped path in azimuth back and forth between two points A and B. That combined action covers the field of regard within the boundary C.

Figure 2:
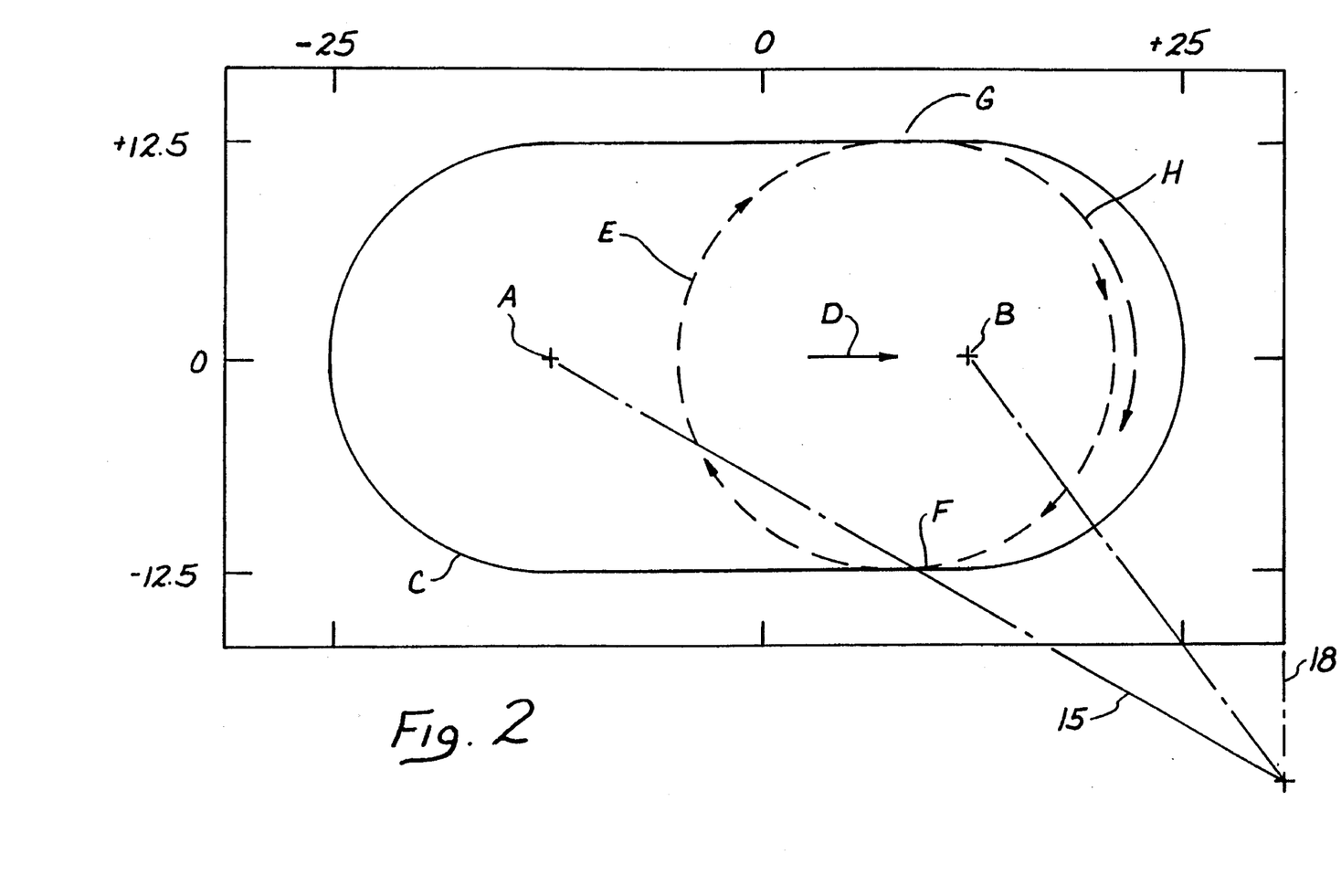
FIG. 2 is an enlarged representation of the field covered by the circular scan pattern produced by the HOE.

As the first scan axis 15 moves back and forth at a relatively slow rate between points A and B as depicted by arrow directions D in FIG. 2, the beam 13 of FIG. 1A scans at a faster rate in a clockwise direction from the viewpoint of the pilot as depicted by the dashed line in FIG. 2. The combined circular and azimuthal scanning action produces a left elevational scan E (from the viewpoint of the pilot) as the beam 13 scans along a semicircularly shaped path between the bottom F of the scan and the top G of the scan, and a right elevational scan H as the beam 13 scans along a semicircularly shaped path between the top G and the bottom F.

Figure 3:
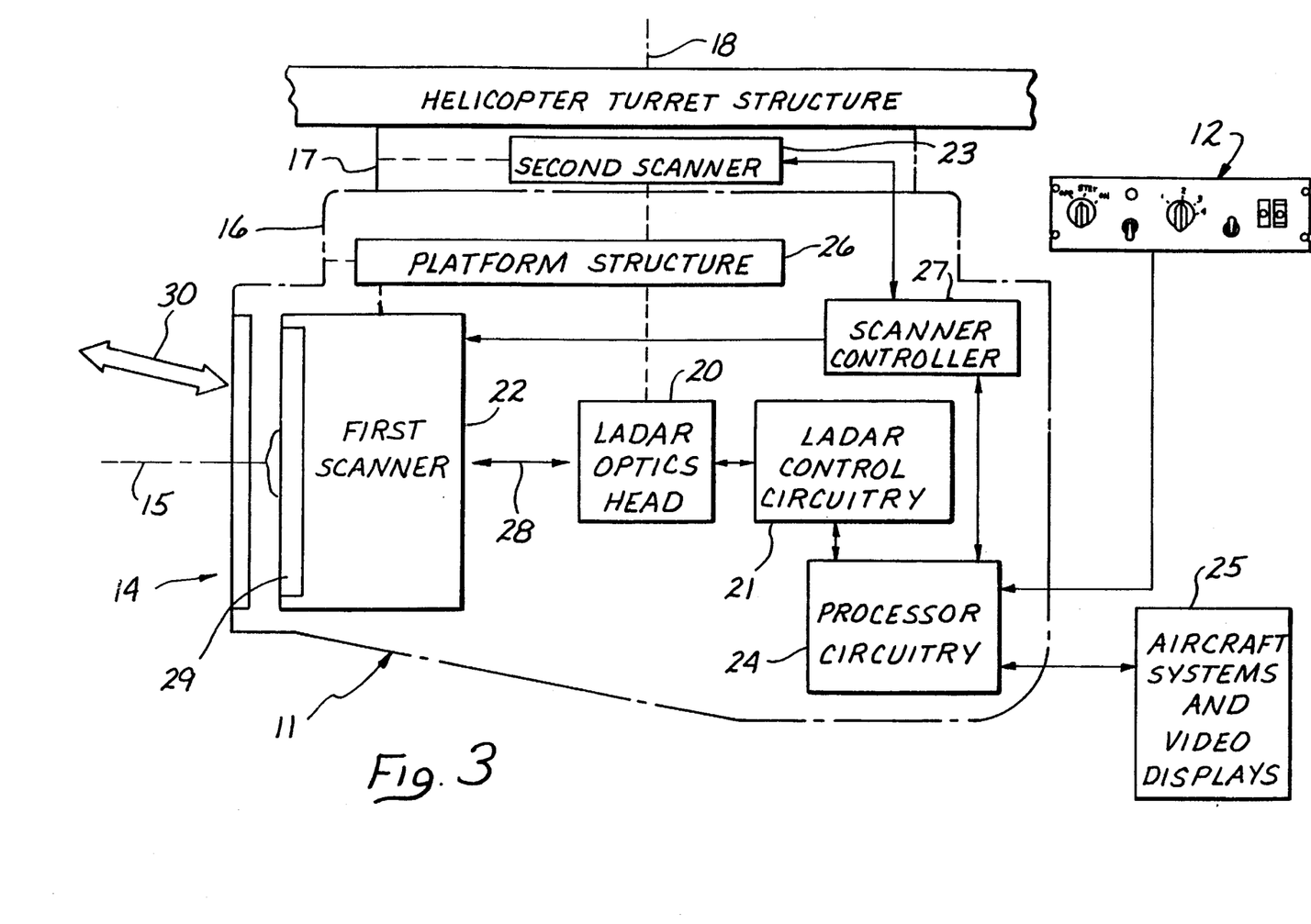
FIG. 3 is a pictorial block diagram of the obstacle avoidance system showing an overview of various components on the turret assembly, the interconnection to aircraft systems, and the location of the HOE.
Figure 4:
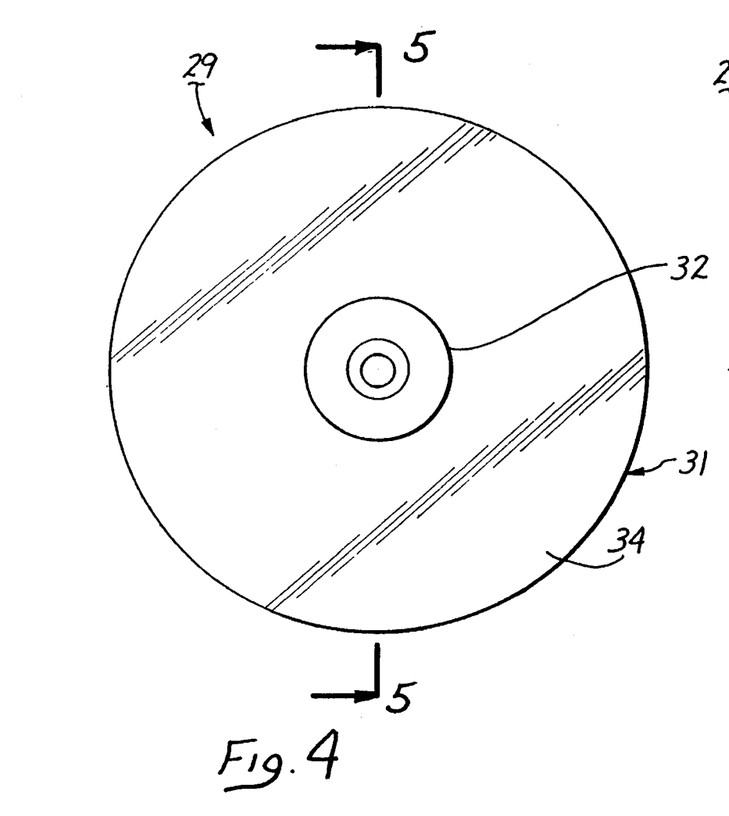
FIG. 4 is a front view of a first HOE constructed according to the invention.

FIG. 3 is an enlarged diagrammatic representation of the turret assembly 11 installed in the helicopter 10. Connected to aircraft power, video, intercom, and avionics systems, the turret assembly 11 operates by combining existing aircraft video or HUD with obstacle-related scan information according to operational modes the pilot sets with the control panel 12. It then feeds the composite flight path information back to the aircraft display system while feeding related audio (i.e., acoustical warnings) to the aircraft intercom system.

To accomplish those functions, the turret assembly 11 includes a ladar optics head 20, associated ladar control circuitry 21, a circular or first scanner 22, an azimuth or second scanner 23, and processor circuitry 24. The ladar optics head 20 emits a pulse of laser beam energy and receives a timed signal return from any nearby objects. The ladar optics head 20 houses four major subassemblies: a transmitter, a receiver, a beamsplitter, and an expander telescope. The first scanner 22 and the second scanner 23 combine to scan the beam over a predetermined field of regard. The ladar control circuitry 21 pulses the beam of laser energy and synchronizes the first and second scanners 22 and 23. It includes a range processor that produces distance information about nearby objects in the field of regard and tracking components that produce orientation information about the instantaneous direction of the beam.

The processor circuitry 24 processes the range data and the directional information along with instrumentation data from an existing aircraft avionics system. It also produces display information about nearby obstacles. For those purposes, the processor circuitry 24 is operatively connected to the ladar control circuitry 21, to the control panel 12, and to aircraft power, display, intercom, and avionic systems depicted by a block 25.

The turret assembly 11 includes a platform structure 26 that serves as a support structure for the ladar optics head 20 and the first scanner 22. The physical connections are depicted diagrammatically in FIG. 3 by dashed lines. Physical connections from the platform structure 26 to the ladar control circuitry 21 and to the processor circuitry 24 are not shown because the ladar control circuitry 21 and the processor circuitry 24 may be mounted elsewhere on the aircraft. The platform structure 26 also physically connects to the lower portion 16 of the turret assembly 11. That way, the window 14 in the lower portion 16 remains aligned with the first scan axis 15 as the platform structure 26 pivots about the second scan axis 18. In addition, the platform structure 26 physically connects to the second scanner 23 which, in turn, physically connects to the upper portion 17 of the turret assembly 11 and, thereby, to the helicopter turret drum structure.

The second scanner 23 scans the beam back and forth in azimuth by pivoting the platform structure 26 relative to the upper portion 17 (and the helicopter turret drum structure) about the second scan axis 18. That action pivots the ladar optics head 20, the first scanner 22, and the window 14 in the lower portion 16 of the turret assembly 11. As a result, the first scan axis 15 moves back and forth in azimuth between the points A and B in FIG. 2 while the beam scans in a circle centered on the first scan axis 15. Of course, one of ordinary skill in the art may construct a turret assembly in any of various physical forms to perform the azimuthal scanning functions described. So, the mechanical layout of the illustrated turret assembly 11 is not given in precise detail.

In operation, the ladar optics head 20 emits an outgoing pulsed beam of laser energy and receives reflected returns at the speed of light on axis relative to the first scan axis 15 as depicted by a double-headed arrow 28 in FIG. 3. The first scanner 22, which occupies a position between the ladar optics head 20 and the window 14, directs the beam off axis to produce a circular scan pattern centered on the first scan axis 15. The illustrated first scanner 22 accomplishes its function with a HOE 29 constructed according to this invention. HOE 29 directs the outgoing beam and receives the returns off the first scan axis 15 (e.g., 12.5 degrees) as depicted by a double-headed arrow 30. The first scanner 22 includes components that spin the HOE 29 about the first scan axis 15 under control of a scanner controller 27 at a fixed rotational rate (e.g., at 110 Hz). That results in a conical scan field with a half angle of 12.5 degrees relative to the first scan axis 15. Of course, the HOE rotation rate for the ladar scan is slow enough such that reflections returning at the speed of light from nearby obstacles enter the first scanner 22 before the HOE 29 spins out of the HOE angular bandwidth of high efficiency.

Meanwhile, the second scanner 23 scans the beam relatively slowly in azimuth by pivoting the ladar optics head 20, the first scanner 22, and the window 14 back and forth about the second scan axis 18 so that the circular scan pattern moves back and forth in azimuth relative to the aircraft. The second scanner 23 does that by pivoting the platform structure 26 and all components mounted on said structure back and forth about the second scan axis 18 (e.g. 12.5 degrees either side of a center position) with an essentially constant angular rate (e.g, an azimuthal sweep rate of about 0.66 Hz), except when reversing the direction of movement. The combined circular and azimuthal scanning results in the scan pattern depicted at reference numeral 19 in FIG. 1, and it covers the field of regard shown within the boundary C in FIG. 2. Of course, the scanner controller 27 is operatively connected to position sensors in the first and second scanners 22 and 23 (e.g., by electrical or optical pickups), but those connections are not shown in FIG. 3 for illustrative convenience.

As scanning continues, the ladar control circuitry 21 processes signal returns in a manner known in the art of ladar to produce range data over the entire field of regard. (E.g., range gating techniques may be necessary to avoid back scatter noise from the optical scanning elements in the first scanner 22 and ladar optics head 20 as well as any dirt on the window 14.) In addition, the scanner controller enables the processor circuitry 24 to keep track of the instantaneous direction of the beam relative to the aircraft (i.e., the first and second scan axes 15 and 18). The processor circuitry 24 processes the range data, directional information about the instantaneous direction of the beam, and instrumentation data to produce visual and acoustical information, and it communicates that information to the pilot using the aircraft display and intercom systems.

Of course, other visual display and intercom systems may be used. The OASYS illustrated in FIGS. 1A, 1B, 1C and 3, however, overlays video information on the Pilot Night Vision System (PNVS) head-tracked Forward Looking Infra Red (FLIR) imagery as well as overlaying it on the existing Head-Mounted Display (HMD) of the Integrated Helmet And Display Sighting System (IHADSS). For that purpose, the illustrated processor circuitry 24 includes multiple processors that are programmed to control the turret assembly 11 and fully integrate the OASYS system with existing aircraft systems.

As an idea of size, the overall height of the illustrated turret assembly 11 is a little less than 35 cm. The depth perpendicular to the plane of the window 14 (along the first scan axis 15) is a little less than 50 cm, and the width is a little less than 40 cm. Of course, those dimensions may vary significantly without departing from the inventive scanning and processing concepts disclosed. Moreover, component placement may vary from that illustrated. For example, processor circuitry and ladar components may be mounted elsewhere on the aircraft in a position apart from the turret assembly 11 in order to reduce turret assembly mass.

Figure 5:
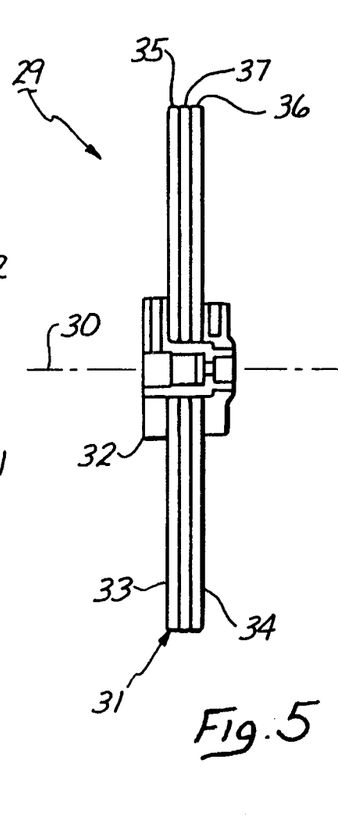
FIG. 5 is a cross sectional view of the first HOE taken on line 5—5 of FIG. 4.

HOE Details. Now consider the HOE 29 in further detail with reference to FIGS. 4–9. It is a 6.25-inch (15.9 cm) diameter, disc-shaped structure having dimensions with rotational symmetry with respect to a rotational axis 30 (FIG. 5). It includes a three-layer composite substrate structure 31 potted into a stainless steel hub 32 that is used to mount the HOE 29 on a shaft of the first scanner 22 in the turret assembly 11 (FIG. 3). When so mounted, the rotational axis 30 aligns with the first scan axis 15. A small offset from perfect alignment (yet within the angular bandwidth of high efficiency) may avoid any back reflection noise to the receiver in the ladar optics head 20 (FIG. 3). Alternatively, range gating circuitry may be incorporated into the ladar control circuitry 21 (FIG. 3) to avoid back reflectance noise to the receiver.

Figure 6:
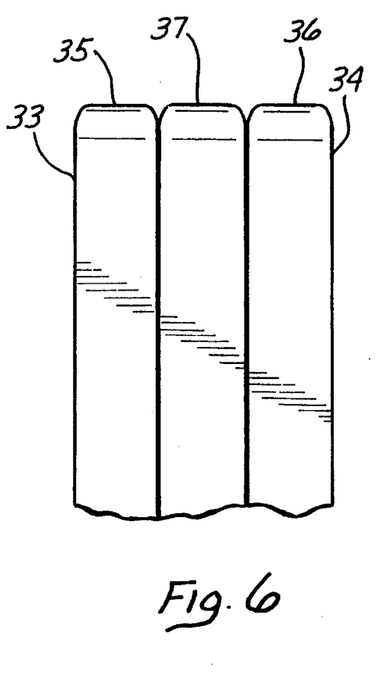
FIG. 6 is an enlarged portion of FIG. 5 showing further details of construction.

In operation, the outgoing beam 13 (FIG. 1A) passes first through a rearward surface 33 of the HOE 29 (FIG. 5), then through holograms and filter elements, and finally out a forward surface 34. As it does so, it passes through a first hologram on a first substrate 35, a second hologram on a second substrate 36, and a filter element on a third substrate 37 (FIGS. 5 and 6). The holograms redirect the beam as desired. The filter element suppresses any zero-order leakage from the first hologram.

Any of various suitable substrate materials may be used, but in the illustrated HOE 29 each of the substrates 35–37 is a one-eighth inch (3.175 mm) thick, disc-shaped piece of glass (e.g., borosilicate BK7 glass). The holograms and the filter element are formed on the glass substrates, and then the three substrates are bonded together by suitable means, such as optical cement, for example, or other means known in the art of optical systems, to form a composite stack structure (i.e., the composite substrate structure 31 ). The first hologram and the filter element face at the interface of the first and third substrates 35 and 37 while the second hologram is located at the interface of the second and third substrates 36 and 37. A properly sealed HOE (known in the art of sandwiching glass with optical cement) provides environmental protection to the humidity-sensitive holograms and filter elements.

Figure 7:
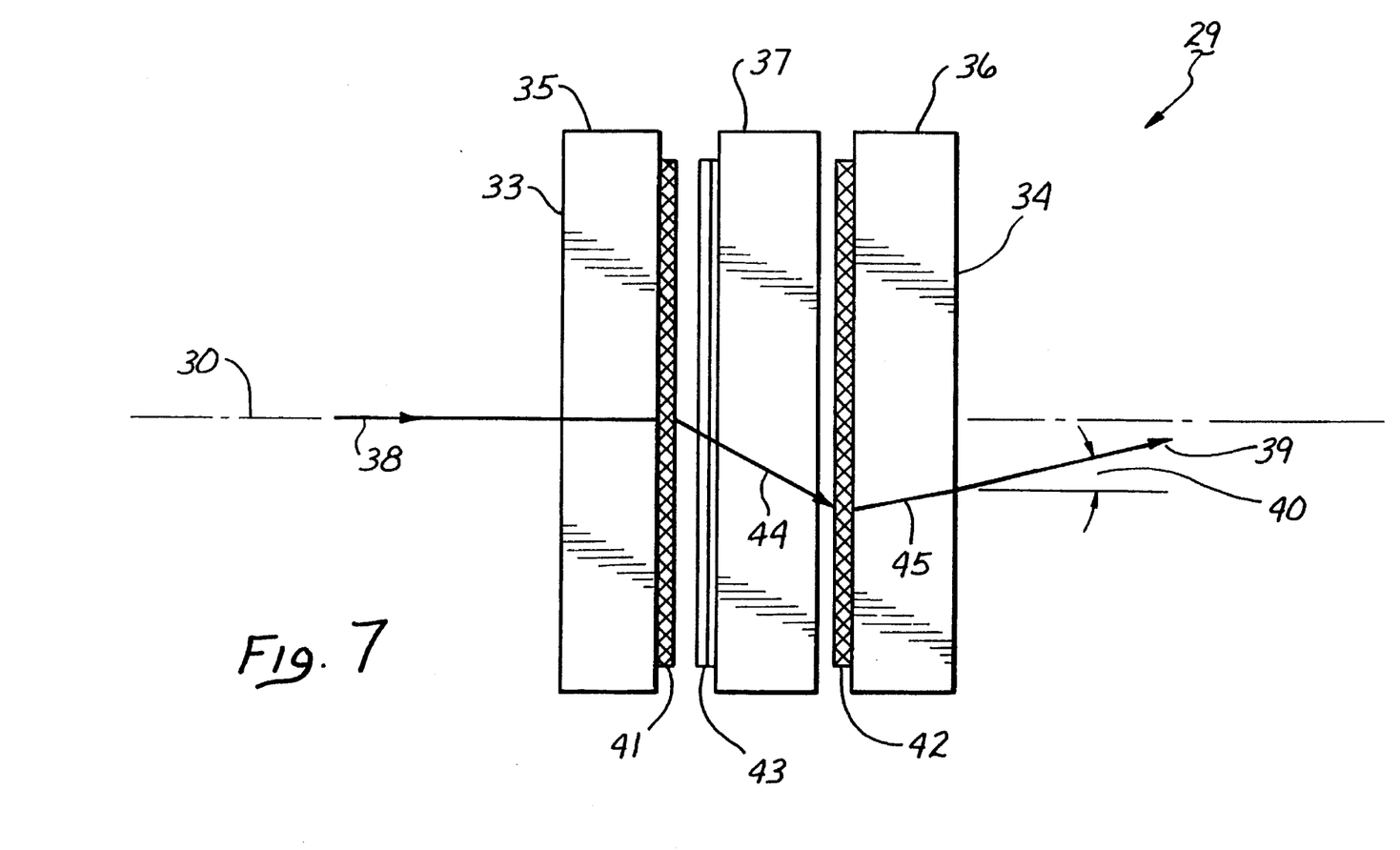
FIG. 7 is a diagrammatic representation of one HOE design showing the first and second holograms and the thin-film interference filter exaggerated in thickness for illustrative convenience.

The holograms may be fabricated using known techniques. They may be about 10 microns thick, and the filter element may be about 5 microns thick. So, FIG. 7 illustrates the holograms and filter element diagrammatically with greatly exaggerated thickness for illustrative convenience.

A normally incident, on-axis incoming beam (depicted in FIG. 7 at reference numeral 38) passes through the rearward surface 33 and exits from the forward surface 34 as an off-axis outgoing beam (depicted at reference numeral 39) that is redirected to an angle 40 (e.g., 12.5 degrees). Enroute, the beam passes through a first hologram 41 on the first substrate 35 (an input hologram), a second hologram 42 on the second substrate 36 (an output hologram), and a filter element 43 on the third substrate 37. The first hologram 41 diffracts the beam by a first acute angle (e.g., 45 degrees) and in a first radial direction from the rotational axis to a first redirected path depicted at reference numeral 44. The second hologram 42 diffracts the beam 44 by a different second acute angle (e.g., 53.186 degrees) and in an opposite second radial direction from the rotational axis to a second redirected path as depicted at reference numeral 45. The air boundary at the forward surface 34 refracts the beam 45 an additional small amount (e.g., 4.314 degrees) according to Snell's Law (e.g., for a 1.52 index medium) to the final off-axis angle 40 (e.g., 12.5 degrees).

Figure 8:
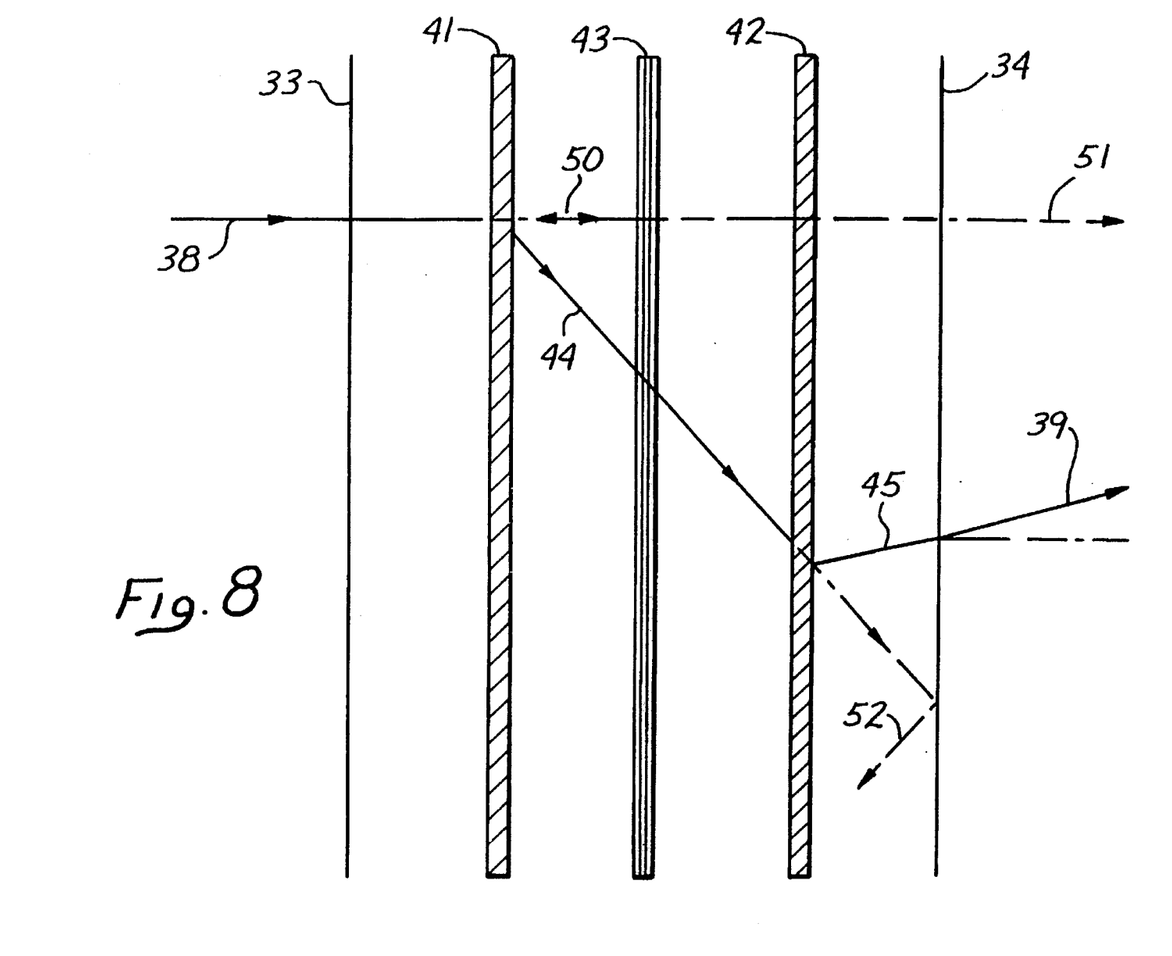
FIG. 8 is a propagation diagram for the FIG. 7 HOE design concept showing total internal reflection.

FIG. 8 is a schematic diagram of the HOE 29. It achieves total internal reflection of any zero-order leakage through the second hologram 42. Any internal angle greater than the critical angle (e.g., about 41.14 degrees relative to the normal direction inside a 1.52 index medium) will be totally internally reflected. For example, in FIG. 8 the first hologram is imprinted so that it diffracts the beam 38 by a 45 degree internal angle as depicted at 44. The second hologram is imprinted so that it diffracts the beam by a 53.186 degree angle in the opposite direction as depicted at 45. The air boundary at the forward surface 34 refracts the beam by 4.314 degrees as depicted at 39 so that the outgoing beam is directed at an off-axis angle of 12.5 degrees.

In theory, a hologram can be 100 percent efficient for a single polarization. This 100 percent efficiency not only may be difficult to achieve in practice, but also may be undesirable for design specifications. For example, it may be desirable (as is the case in the illustrated embodiments) to have a polarization-insensitive hologram. That requires tuning the efficiencies of both holograms to an equal amount less than 100 percent for each of two orthogonal polarizations.

In FIG. 8 some energy striking the first hologram 41 passes through undiffracted. Suppression of the undeviated (zero-order) beam is accomplished with a thin-film interference filter sandwiched between the two holograms. Any of several filter design alternatives may be used. It is intended that the filter element 43 serves to illustrate any such filter elements.

Preferably, a computer-optimized, wide-band, long-wavelength-pass reflector stack is sandwiched within the HOE. The design and production of such a reflector stack is not necessarily unique and can be generated by one skilled in the art and technology of thin-film dielectric interference filters. The reflector stack reflects the zero-order beam (as depicted by the reverse arrowhead at 50) while passing the first and higher order beams beyond an angle of about 42 degrees. It does so over a fairly broad tolerance in bandwidth (e.g., about 850±25 nm) at normal incidence while transmitting most of the first-order beam at 45 degrees, effectively independent of polarization. Residual zero-order leakage (depicted at 51) is orders of magnitude less. Total internal reflection of zero-order leakage through the second hologram 42 occurs at the forward surface 34 as depicted at 52. That zero-order leakage dissipates internally (e.g., at the inner and outer diameter edges of the HOE disk). Alternatively, the filter element 43 may take the form of a reflection or transmission hologram without departing from the broader inventive concepts disclosed.

Another design, one with lower internal diffraction angles, can have advantages of a larger bandwidth, a higher polarization-insensitive efficiency, and ease of fabrication, but it may no longer have total internal reflection properties. For example, in FIG. 8 the first hologram 41 may be imprinted to diffract at a 30 degree internal angle and the second hologram by about 38.186 degrees. To compare designs with different internal angles, one can use the theory of H. Kogelnik, in The Bell System Technical Journal, Vol. 48, pp. 2909–2947 (1969). A HOE design with an internal angle of 45 degrees can, at maximum, only have polarization-insensitive efficiency of 79.2 percent; in contrast, a HOE design with an internal angle of 30 degrees can, at maximum, have a polarization-insensitive efficiency of 95.2 percent and an angular bandwidth over 2 degrees for efficiency above 80 percent. A disadvantage is that it requires another filter element to diminish the zero-order beam from the second hologram.

Figure 9:
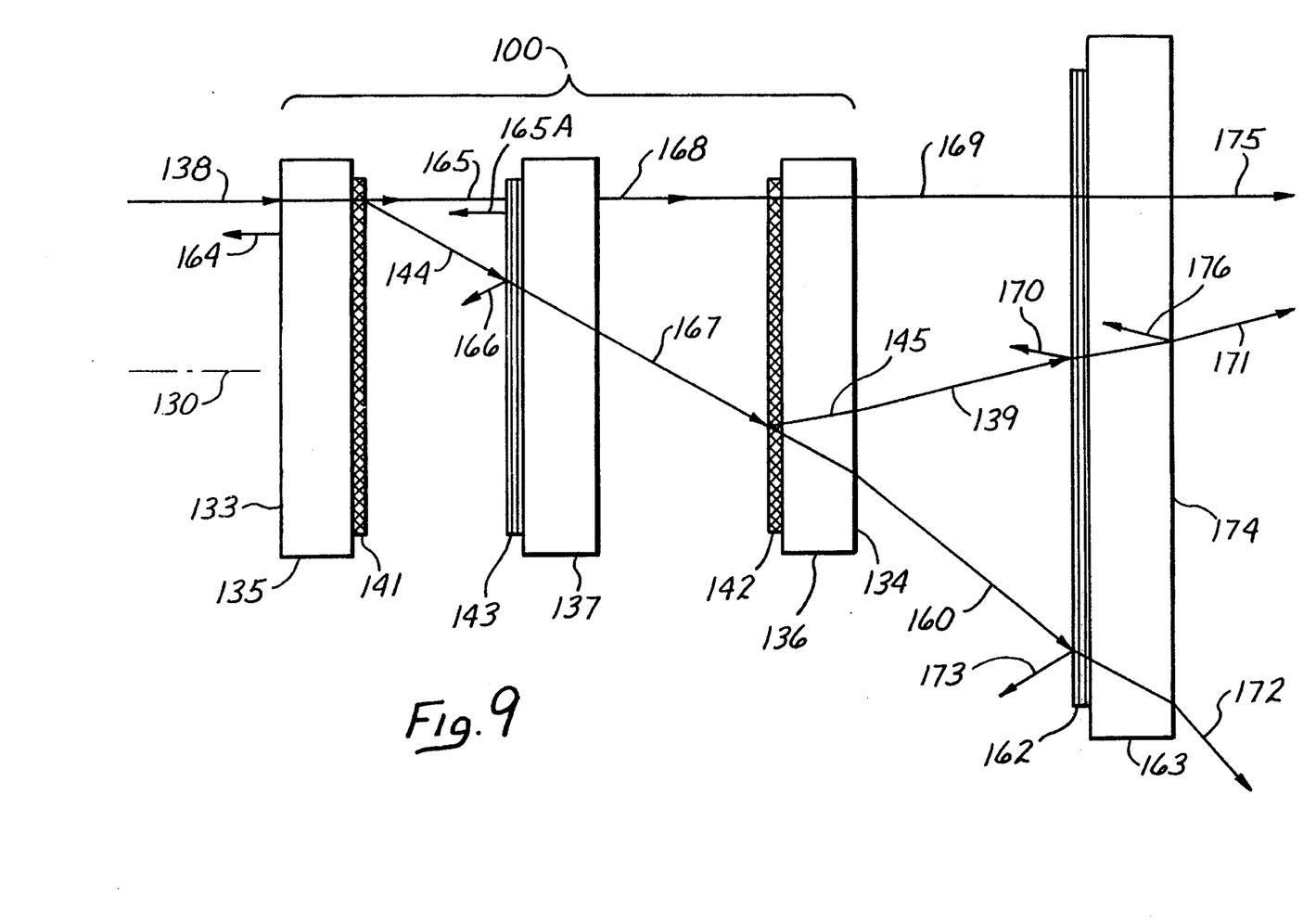
FIG. 9 is a propagation diagram for an alternative HOE design concept that uses a thin film interference filter on the window instead of total internal reflection to achieve the desired suppression.

FIG. 9 shows a HOE 100 that employs such a 30 degree internal angle design. It is similar in many respects to the HOE 29, and so only differences are described in further detail. For convenience, reference numerals designating parts of the HOE 100 are increased by one hundred over those designating corresponding parts of the HOE 29. Thus, the HOE 100 includes first, second, and third substrates 135, 136, and 137. A first hologram 141 on the first substrate 135 is imprinted so that it diffracts a normally incident incoming beam 138 off axis by a first acute angle (30 degrees internal) and in a first radial direction from a rotational axis 130 to a first redirected path depicted at reference numeral 144. A second hologram 142 on the second substrate 136 is imprinted so that it diffracts the beam by a second acute angle (38.186 degrees internal) and in an opposite second radial direction from the rotational axis to a second redirected path as depicted at reference numeral 145. The air boundary at the forward surface 134 refracts the beam an additional small amount to a final off-axis angle as depicted at reference numeral 139.

Although the HOE 100 includes a filter element 143 on the third substrate 137 to suppress zero order leakage from the first hologram 141, the 30 degree internal beam in the HOE 100 does not produce total internal reflection, and so zero-order leakage occurs from the second hologram 142 as depicted at reference numeral 160. However, the HOE 100 is incorporated with a thin film filter element 162 on a glass window 163 just ahead of the HOE 100. The filter element 162 suppresses the zero-order leakage from the second hologram without significantly affecting transmittance of the beam 139. Alternatively, the filter element 162 may be placed on the front surface 134 of the HOE 100. In either case, filter element 162 may be a computer-optimized, wide-band, short-wavelength-pass, reflector stack, the design and fabrication of which is within the capabilities of one of ordinary skill in the art and technology of thin-film dielectric interference filters.

In terms of transmittance and reflectance, the first substrate 135 in FIG. 9 (like the first substrate 35 in FIG. 7) reflects only a small amount of the incoming beam 138 at reference numeral 164 and transmits the rest (as does the first substrate 35 in FIG. 8). It may include an antireflection coating on a rearward surface 133 that exhibits that effect. The design and fabrication of such an antireflection coating may be accomplished by one of ordinary skill in the art and technology of thin-film interference filters. Meanwhile, the first hologram 141 transmits with a high efficiency for both polarizations at 144 (with some zero-order leakage at 165).

The filter element 143 reflects only a very little of the first order beam at 30 degrees internal at reference numeral 166 while transmitting most of the first order beam at 30 degrees internal at reference numeral 167. It reflects most of the zero order beam at reference numeral 165A while transmitting only a very little of the incoming beam 138 at reference numerals 168 and continuing at 169 and 175.

The second hologram 142 diffracts most of beam 167 into beam 145, which in turn is refracted into beam 139. Any zero-order leakage from the second hologram 142 continues at 160. The second substrate 136 may also include an antireflection coating that transmits most of the beam 139 at the scan angle of 12.5 degrees in air.

The filter element 162 transmits most of the beam 139 at 12.5 degrees to produce the scanning beam 171, while reflecting only a very little at reference numeral 170. It transmits only a very little of the beam 160 at reference numeral 172 while reflecting most of the beam 160 at reference numeral 173. The window 163 may include an antireflection coating on a forward surface 174 that transmits most of the scanning beam 171 while reflecting very little of the signal beam at reference numeral 176. With actual filters, the HOE 100 and filter element 162 can combine to maintain one-way residual zero-order leakages (beams 172 and 175) at typically less than about 0.07% ($7 \times 10^{-4}$).

Alternatively, the filter element 143 in FIG. 9 may take the form of a third, transmitting hologram that provides a filtering effect by diffracting the zero-order beam 165 into a high but opposite angle relative to the beam 167. The filter 162 then suppresses it (i.e., reflects it). In that case, the third hologram may be substantially identical to the first hologram 141, but rotated about 180 degrees about the axis 130. The third hologram passes most of the intended first order beam 144 from the first hologram 141 into the beam 167.

Of course, various HOE designs with other internal angles may be employed. For example, the second hologram need not diffract at an opposite internal angle larger than the first hologram's diffraction angle. (E.g., the first hologram could diffract at 45 degrees internally, and the second hologram could diffract in the opposite direction at 36.814 degrees to achieve a 12.5 degree output angle. Such a hologram, however, is more difficult to fabricate.

A laser scanner system constructed according to the invention may include additional beam-expanding optics, such as a Cassegrain-type telescope. The telescope is part of the ladar optics head 20 of FIG. 3. In addition to eye-safe considerations, such beam expanding is necessary for obtaining high resolution images with low beam divergence and for collecting return energy efficiently. A conventional Cassegrain telescope has aspheric optics: a parabolic primary mirror and a hyperbolic secondary mirror. Although, spherical primary and secondary mirrors are less expensive to fabricate and easier to align, they can result in unacceptable optical aberrations. Correction of those aberrations may be accomplished using a conventional Schmidt-type aspheric corrector. But it is bulky and expensive. According to another aspect of the invention, the HOE is used to eliminate the Schmidt corrector by performing aberration correction in addition to performing the laser scanning functions. The aberration correction is embedded in hologram 141 or 142 or FIG. 9, or split between 141 and 142.

As those of ordinary skill in the art of holography know, fabrication of holograms such as the holograms 141 and 142 is accomplished by recording the interference pattern generated by merging two collimated laser beams, an object beam and a reference beam. Those of ordinary skill in the art of hologram fabrication can design the recording optics to provide the appropriate beam angles and intensities. Furthermore, aberration correction can be embedded in the hologram by introducing aberration into the object beam. This is accomplished by using spherical collimating optics to generate the object beam. These optics may include spherical lenses and/or mirrors. Those of ordinary skill in the art of optical engineering can design the recording optics which add the appropriate aberrations.

Thus, the invention provides a HOE that directs a normally incident on-axis beam to a small off-axis angle while spreading the beam over a sufficiently large exit aperture to reduce the beam intensity to eye-safe levels. It uses a two-step approach in redirecting the incoming beam while including filter suppression of stray light. The two holograms are conveniently producible with current technology. They may be combined with currently available interference filters for less zero-order leakage, less scatter, and less absorption loss. A master hologram for each hologram employed can be either a computer generated hologram or an optically generated hologram. Any additional holograms can be copied by contact printing. Moreover, the holograms provide substantial saving in weight, volume, and cost over conventional optics.

Although an exemplary embodiment has been shown and described, one of ordinary skill in the art may make many changes, modifications, and substitutions without necessarily departing from the spirit and scope of the invention.

What is claimed is:

1. A holographic optical element, comprising:

means in a form of a substrate structure having rotational symmetry with respect to a rotational axis for rotatively supporting at least two holograms, the substrate structure including first, second, and third substrates bonded together such that the third substrate is bonded between the first and second substrates;

means in the form of a first hologram on the first substrate in the path of a normally incident beam for diffracting the beam by a first acute angle and in a first radial direction from the rotational axis to a first redirected path;

means in the form of a second hologram on the second substrate in the first redirected path for diffracting the beam by a different second acute angle and in an opposite second radial direction from the rotational axis to a second redirected path, whereby the second redirected path is at an angle to the rotational axis that has a size which is the difference between the size of the first angle and the size of the second angle; and, means in the form of a filter element on the third substrate for suppressing zero-order leakage of the incident beam through the first hologram.

2. A holographic optical element as recited in claim 1, wherein the filter element comprises a thin-film interference filter on the third substrate.

3. A holographic optical element as recited in claim 2, wherein the thin-film interference filter comprises a dielectric stack.

4. A holographic optical element as recited in claim 1, wherein the substrate structure comprises a disc-shaped structure.

5. A holographic optical element as recited in claim 1,, wherein the first and second holograms are imprinted so that the first and second angles are within the range of 20 degrees to 60 degrees.

6. A holographic optical element as recited in claim 5, wherein the first and second holograms are imprinted so that the first angle is approximately 45 degrees internal and the second angle is approximately 53 degrees internal.

7. A holographic optical element as recited in claim 5, wherein the first and second holograms are imprinted so that the first angle is approximately 30 degrees internal and the second angle is approximately 38 degrees internal.

8. A holographic optical element as recited in claim 7, wherein:

the first hologram diffracts less than a critical angle necessary for internal reflection of zero-order leakage of the normally incident beam.

9. A holographic optical element as recited in claim 1, wherein the first hologram is imprinted to achieve substantially total internal reflection of zero-order leakage through the second hologram.

10. A holographic optical element as recited in claim 1, wherein at least one of the first and second holograms is imprinted to correct spherical aberration.

11. A holographic optical element as recited in claim 1, wherein the filter element comprises a transmission hologram.

12. A holographic optical element as recited in claim 1, wherein the filter element comprises a reflection hologram.

13. A holographic optical element, comprising:

means in a form of a substrate structure having rotational symmetry with respect to a rotational axis for rotatively supporting at least two holograms and a thin-film filter element in the path of a normally incident, axially directed beam in order to direct the beam in a desired off-axis direction and suppress zero-order leakage, the substrate structure including first, second, and third substrates bonded together so that the third substrate is in between the first and second substrates;

means in a form of a first hologram on the first substrate for redirecting the beam by a first acute angle and in a first radial direction from the rotational axis to a first redirected path;

means in a form of a second hologram on the second substrate for redirecting the beam by a different second acute angle and in an opposite second radial direction from the rotational axis to a second redirected path so that the second redirected path is at an angle to the rotational axis that has a size which is the difference between the size of the first angle and the size of the second angle; and means in a form of a thin-film interference filter on the third substrate for suppressing zero-order leakage of the incident beam through the first hologram.

\* \* \* \* \*